US007818170B2

(12) United States Patent
Cheng

(10) Patent No.: US 7,818,170 B2
(45) Date of Patent: Oct. 19, 2010

(54) METHOD AND APPARATUS FOR DISTRIBUTED VOICE SEARCHING

(75) Inventor: Yan Ming Cheng, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 772 days.

(21) Appl. No.: 11/733,306

(22) Filed: Apr. 10, 2007

(65) Prior Publication Data

US 2008/0256033 A1 Oct. 16, 2008

(51) Int. Cl.
*G10L 17/00* (2006.01)
(52) U.S. Cl. ............... 704/249; 704/270; 704/270.1; 704/7
(58) Field of Classification Search .......... 704/257, 704/1, 3, 4, 7, 9, 231, 235, 270, 275, 270.1, 704/249, 251, 254
See application file for complete search history.

(56) References Cited

U.S. PATENT DOCUMENTS

| 6,182,938 B1 | 2/2001 | Wright |
| 6,633,846 B1 * | 10/2003 | Bennett et al. ............ 704/257 |
| 6,999,932 B1 | 2/2006 | Zhou |

FOREIGN PATENT DOCUMENTS

| KR | 10-1999-0183140 B1 | 5/1999 |
| KR | 10-2001-0012024 A | 2/2001 |

OTHER PUBLICATIONS

Seok Hyung Lee, "PCT/US2008/058890—PCT International Search Report and Written Opinon," WIPO, ISA/KR, Korean Intellectual Property Office, Daejeon, Republic of Korea, Jul. 31, 2008.
Philippe Becamel, "PCT/US2008/058890—PCT International Preliminary Report on Patentability," The International Bureau of WIPO, Geneva, Switzerland, Oct. 22, 2009.

* cited by examiner

*Primary Examiner*—Huyen X. Vo

(57) ABSTRACT

A method for distributed voice searching may include receiving a search query from a user of the mobile communication device, generating a lattice of coarse linguistic representations from speech parts in the search query, extracting query features from the generated lattice of coarse linguistic representations, generating coarse search feature vectors based on the extracted query features, performing a coarse search using the generated coarse search feature vectors and transmitting the generated coarse search feature vectors to a remote voice search processing unit, receiving remote resultant web indices from the remote voice search processing unit, generating a lattice of fine linguistic representations from speech parts in the search query, generating fine search feature vectors from the lattice of fine linguistic representations, performing a fine search using the coarse search results, the remote resultant web indices and the generated fine search feature vectors, and displaying the fine search results to the user.

10 Claims, 6 Drawing Sheets

METHOD AND APPARATUS FOR DISTRIBUTED VOICE SEARCHING

RELATED APPLICATION DATA

This application is related to U.S. patent application Ser. No. 11/566,832, filed Dec. 5, 2006, entitled "Content Selection Using Speech Recognition."

BACKGROUND OF THE INVENTION

1. Field of the Invention

The invention relates to mobile communication devices, and in particular, to voice searching using a mobile communication device.

2. Introduction

Mobile communication devices such as cellular phones are very pervasive communication devices used by people of all languages. The usage of the devices has expanded far beyond pure voice communication. User is able now to use the mobile communication devices to browse local multimedia content. User can also browse the multimedia content in web from the device.

While these capabilities have been expanded, the ability to search the multimedia content in mobile device and web is limited. Due to the difficulty of navigating the contents with buttons, mobile communication device users may find it useful to be able to quickly find multimedia content on both mobile device and web seamlessly.

SUMMARY OF THE INVENTION

A method and apparatus for distributed voice searching using a mobile communication device is disclosed. The method may include receiving a search query from a user of the mobile communication device, generating a lattice of coarse linguistic representations from speech parts in the search query, extracting query features from the generated lattice of coarse linguistic representations, generating coarse search feature vectors based on the extracted query features, performing a coarse search using the generated coarse search feature vectors and transmitting the generated coarse search feature vectors to a remote voice search processing unit, receiving remote resultant web indices from the remote voice search processing unit based on the generated coarse search feature vectors, generating a lattice of fine linguistic representations from speech parts in the search query based on the coarse search results and the remote resultant web indices, generating fine search feature vectors from the lattice of fine linguistic representations, performing a fine search using the coarse search results, the remote resultant web indices and the generated fine search feature vectors, and displaying the fine search results to the user.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

This invention concerns a language independent indexing and search process that can be used for the fast and seamless retrieval of multimedia content located on a mobile communication device and/or the Internet (web).

In this manner, a search automated speech recognizer (ASR) may convert the speech part of a search query into phoneme (coarse linguistic representation) and/or word (fine linguistic representations) lattices. Then, the phoneme and word lattices may be converted into coarse search feature vectors and fine search feature vectors respectively, for example. Multimedia content on both the mobile communication device and web, which have linguistic representations through metadata, may also be directly converted into phonemic and word representations and then into coarse search feature vectors and fine search feature vectors, respectively.

This voice search process may be broken down in to two stages. In the first stage, a coarse search may be conducted to match the coarse search feature vectors of the speech query against the coarse search feature vectors of multimedia content on both mobile communication device and web to rapidly obtain a set of candidate results. Then, a word lattice may be generated from the speech parts of the search query based on the candidate results, and then fine search vectors can be converted from the word lattice of the search query. The linguistic representation of candidate results of the coarse search may also be directly converted into word representations and then, fine search feature vectors.

In the second stage of the search process, a fine search may be conducted to match the fine search feature vectors of speech query against fine search feature vectors of the candidate results of the coarse search to obtain final search results to display to user.

Figure 1:
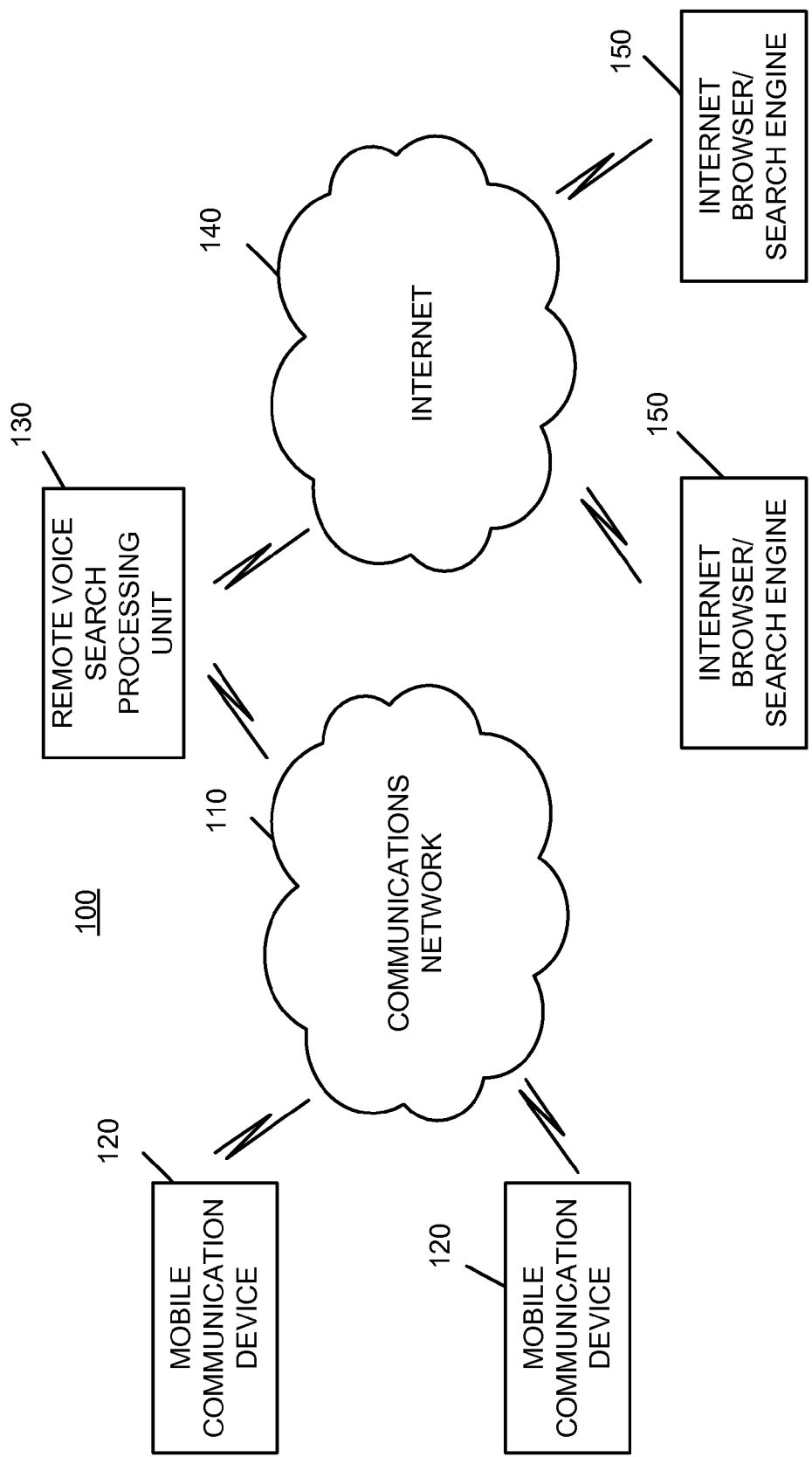
FIG. 1 illustrates an exemplary diagram of a communications network environment in accordance with a possible embodiment of the invention.

FIG. 1 is an exemplary diagram of a communications network environment in accordance with a possible embodiment of the invention. The communications network environment 100 may include communications network 110, a plurality of mobile communication devices 120, a remote voice search processing unit 130, the Internet (web) 140, and a plurality of Internet browser/search engines 150.

One of skill in the art will appreciate that the communications network environment 100 may be any possible configuration in which a mobile communication device 120 may communicate with another mobile communications device 120, as well as devices connected to the Internet 140. As such, communications network 110 may represent any possible communications that may be accessed by mobile communication devices 120, such as a telephone network, a wireless network, a cable television network, a satellite television network, a satellite radio network, etc.

The Internet ("web") 140 may represent the World Wide Web (WWW), an intranet, or any other network system capable of hosting domains containing searchable text and media content that may be downloaded and/or played, for example.

The mobile communication device 120 may represent any mobile or portable device having the ability to internally or externally record and or store audio, including a mobile telephone, cellular telephone, a wireless radio, a portable computer, a laptop, an MP3 player, a satellite radio, and a satellite television.

The Internet browser/search engine 150 may represent any known web browser and/or search engine capable of searching and indexing content located on the Internet, such as Yahoo, Google, etc.

Figure 2:
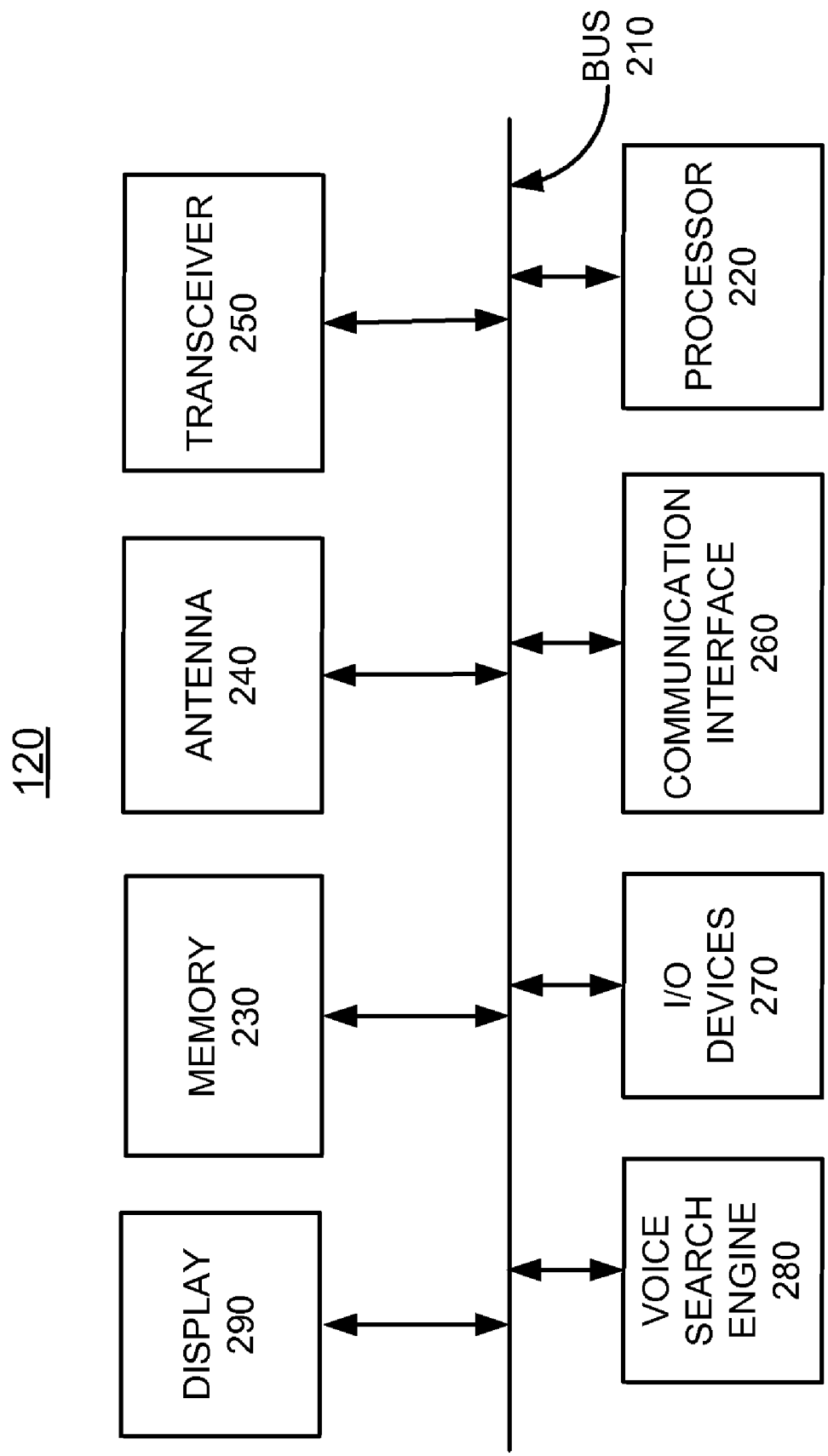
FIG. 2 illustrates a block diagram of an exemplary mobile communication device in accordance with a possible embodiment of the invention.

FIG. 2 illustrates a block diagram of an exemplary mobile communication device 120 having a voice search engine 280 in accordance with a possible embodiment of the invention. The exemplary mobile communication device 120 may include a bus 210, a processor 220, a memory 230, an antenna 240, a transceiver 250, a communication interface 260, input/output (I/O) devices 270, voice search engine 280, and display 290. Bus 210 may permit communication among the components of the mobile communication device 120.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Transceiver 250 may include one or more transmitters and receivers. The transceiver 250 may include sufficient functionality to interface with any network or communication station and may be defined by hardware or software in any manner known to one of skill in the art. The processor 220 is cooperatively operable with the transceiver 250 to support operations within the communications network 110.

Input/output devices (I/O devices) 270 may include one or more conventional input mechanisms that permit a user to input information to the mobile communication device 120, such as a microphone, touchpad, keypad, keyboard, mouse, pen, stylus, voice recognition device, buttons, etc. Output devices may include one or more conventional mechanisms that outputs information to the user, including a display, printer, one or more speakers, a storage medium, such as a memory, magnetic or optical disk, and disk drive, etc., and/or interfaces for the above. Display 290 may be a device cable of displaying information to the user of the mobile communication device 120.

Communication interface 260 may include any mechanism that facilitates communication via the communications network 110. For example, communication interface 260 may include a modem. Alternatively, communication interface 260 may include other mechanisms for assisting the transceiver 250 in communicating with other devices and/or systems via wireless connections.

The functions of the voice search engine 280 will be discussed below in relation to FIGS. 3 and 5 in greater detail.

The mobile communication device 120 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 260.

Figure 3:
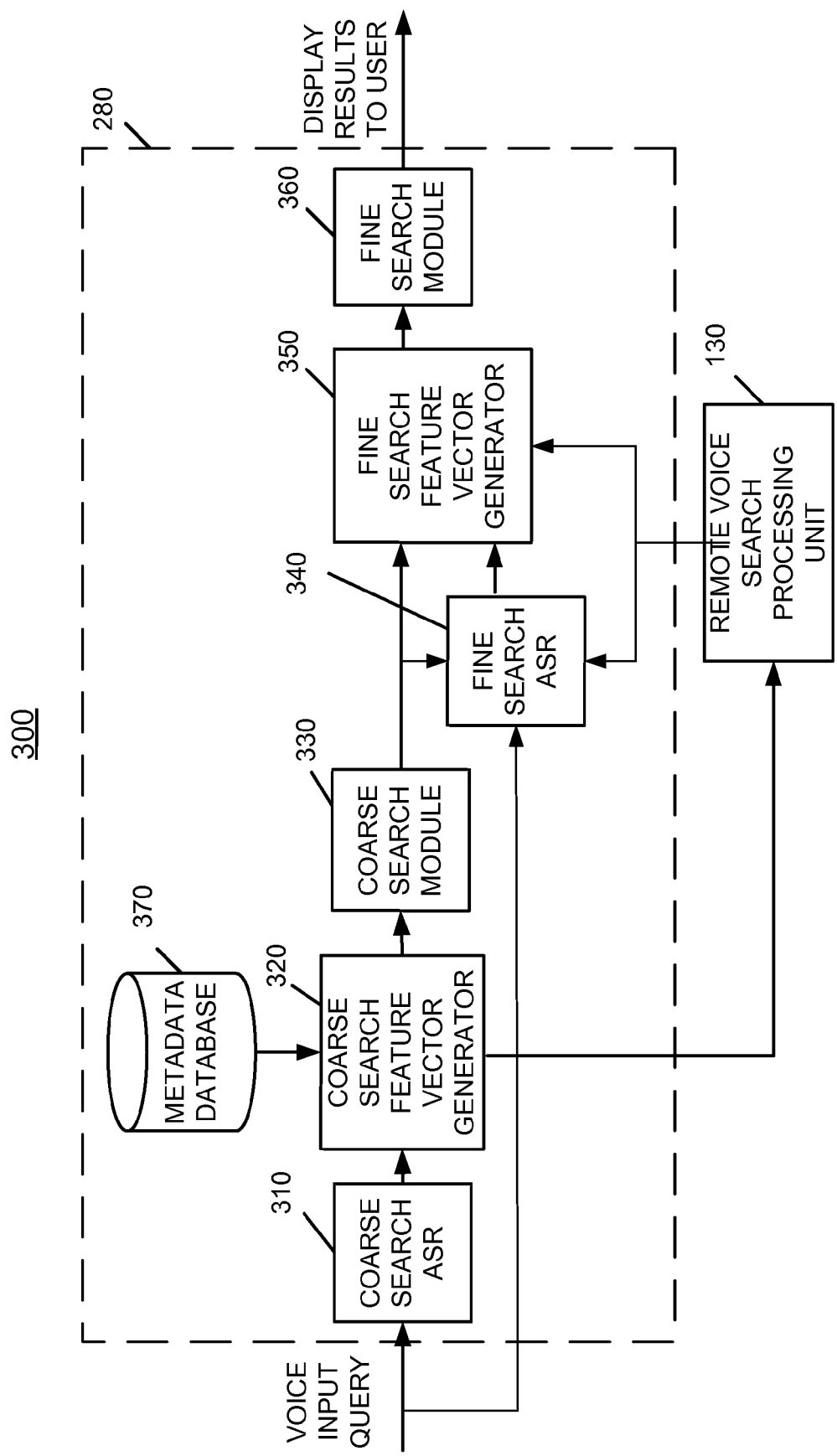
FIG. 3 illustrates an exemplary block diagram of the voice search engine in accordance with a possible embodiment of the invention.

FIG. 3 is a block diagram of an exemplary distributed voice search system 300 having a voice search engine 280 in accordance with a possible embodiment of the invention. Voice search engine 280 may include coarse search ASR 310, coarse search feature vector generator 320, coarse search module 330, fine search ASR 340, fine search feature vector generator 350, fine search module 360, and metadata database 370. For ease of discussion, the voice search engine 280 is shown coupled to the remote voice search processing unit 130 directly, but as explained above, this coupling may occur through the communication network 110 and/or Internet 140.

The metadata database 370 may store multimedia content with linguistic metadata. The multimedia content may include audio files, audio recordings, emails, voice mails, recorded conversations, notes, messages, text messages, photos, video files, movie files, and television recordings, etc., for example.

For illustrative purposes, the voice search engine 280 and its corresponding process will be described in FIG. 5 below in relation to the block diagrams shown in FIGS. 1-3.

Figure 4:
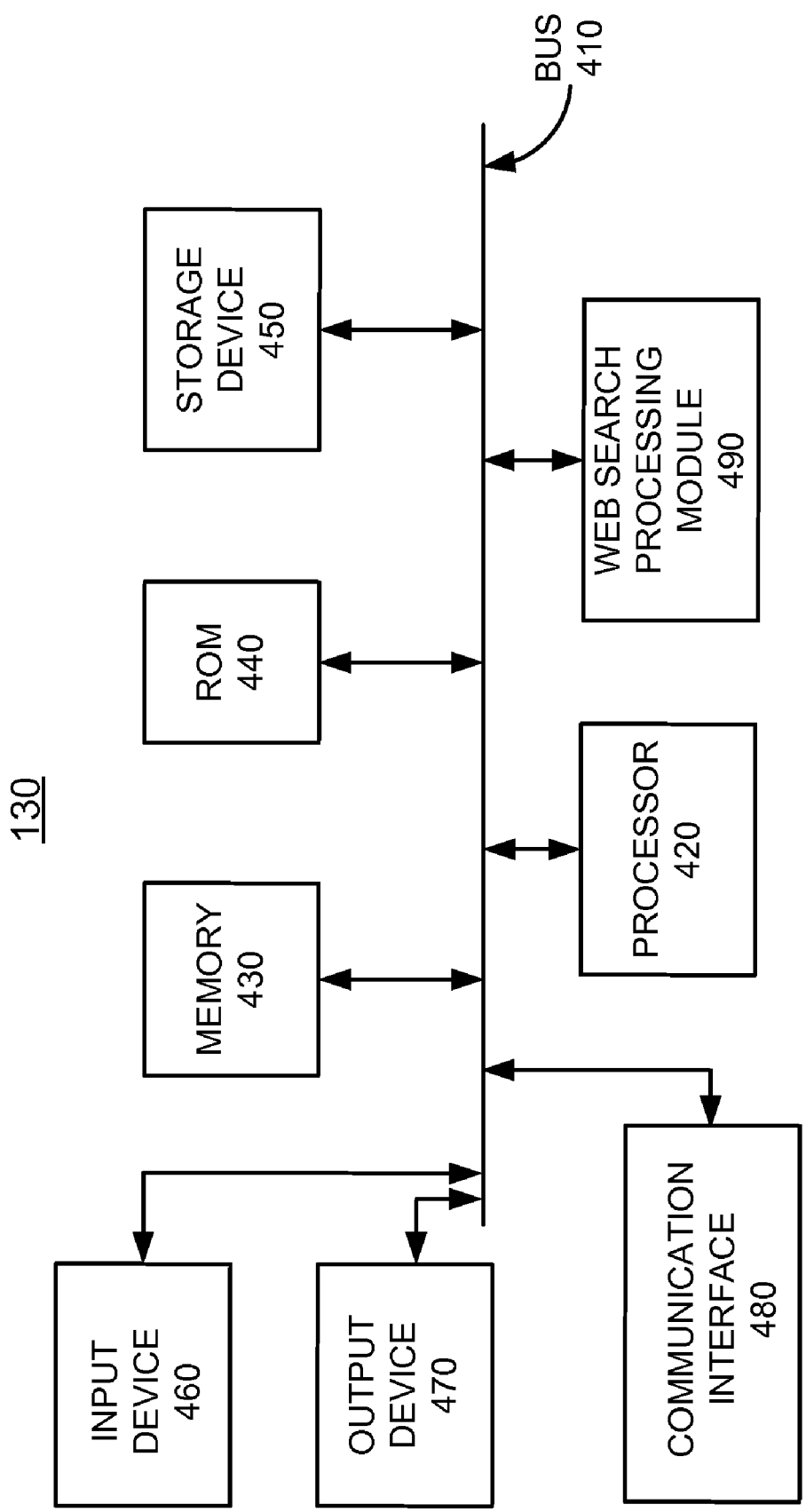
FIG. 4 illustrates a block diagram of an exemplary remote voice search processing unit in accordance with a possible embodiment of the invention.

FIG. 4 illustrates a block diagram of an exemplary remote voice search processing unit 130 in accordance with a possible embodiment of the invention. The exemplary remote search processing unit 130 may include a bus 410, a processor 420, a memory 430, a read only memory (ROM) 440, a storage device 450, an input device 460, an output device 470, a communication interface 480, and web search processing module 490. Bus 410 may permit communication among the components of the remote search processing unit 130.

Processor 420 may include at least one conventional processor or microprocessor that interprets and executes instructions. Memory 430 may be a random access memory (RAM) or another type of dynamic storage device that stores information and instructions for execution by processor 420. Memory 430 may also store temporary variables or other intermediate information used during execution of instructions by processor 420. ROM 440 may include a conventional ROM device or another type of static storage device that stores static information and instructions for processor 420. Storage device 450 may include any type of media, such as, for example, magnetic or optical recording media and its corresponding drive.

Input device 460 may include one or more conventional mechanisms that permit a user to input information to the remote search processing unit 130, such as a keyboard, a mouse, a pen, a voice recognition device, etc. Output device 470 may include one or more conventional mechanisms that output information to the user, including a display, a printer, one or more speakers, or a medium, such as a memory, or a magnetic or optical disk and a corresponding disk drive.

Communication interface 480 may include any transceiver-like mechanism that enables the remote search processing unit 130 to communicate via a network. For example, communication interface 480 may include a modem, or an Ethernet interface for communicating via a local area network (LAN).

Alternatively, communication interface 480 may include other mechanisms for communicating with other devices and/or systems via wired, wireless or optical connections. In some implementations of the communications network environment 100, communication interface 480 may not be included in the exemplary remote search processing unit 130 when the remote search process is implemented completely within the remote search processing unit 130.

The remote search processing unit 130 may perform such functions in response to processor 420 by executing sequences of instructions contained in a computer-readable medium, such as, for example, memory 430, a magnetic disk, or an optical disk. Such instructions may be read into memory 430 from another computer-readable medium, such as storage device 450, or from a separate device via communication interface 480.

The operation of the mobile communication device 130/voice search engine 280 and the remote search processing unit 130/websearch processing module 490 and their related processes will be described further below in relation to the flowchart in FIGS. 5 and 6, respectively.

Figure 5:
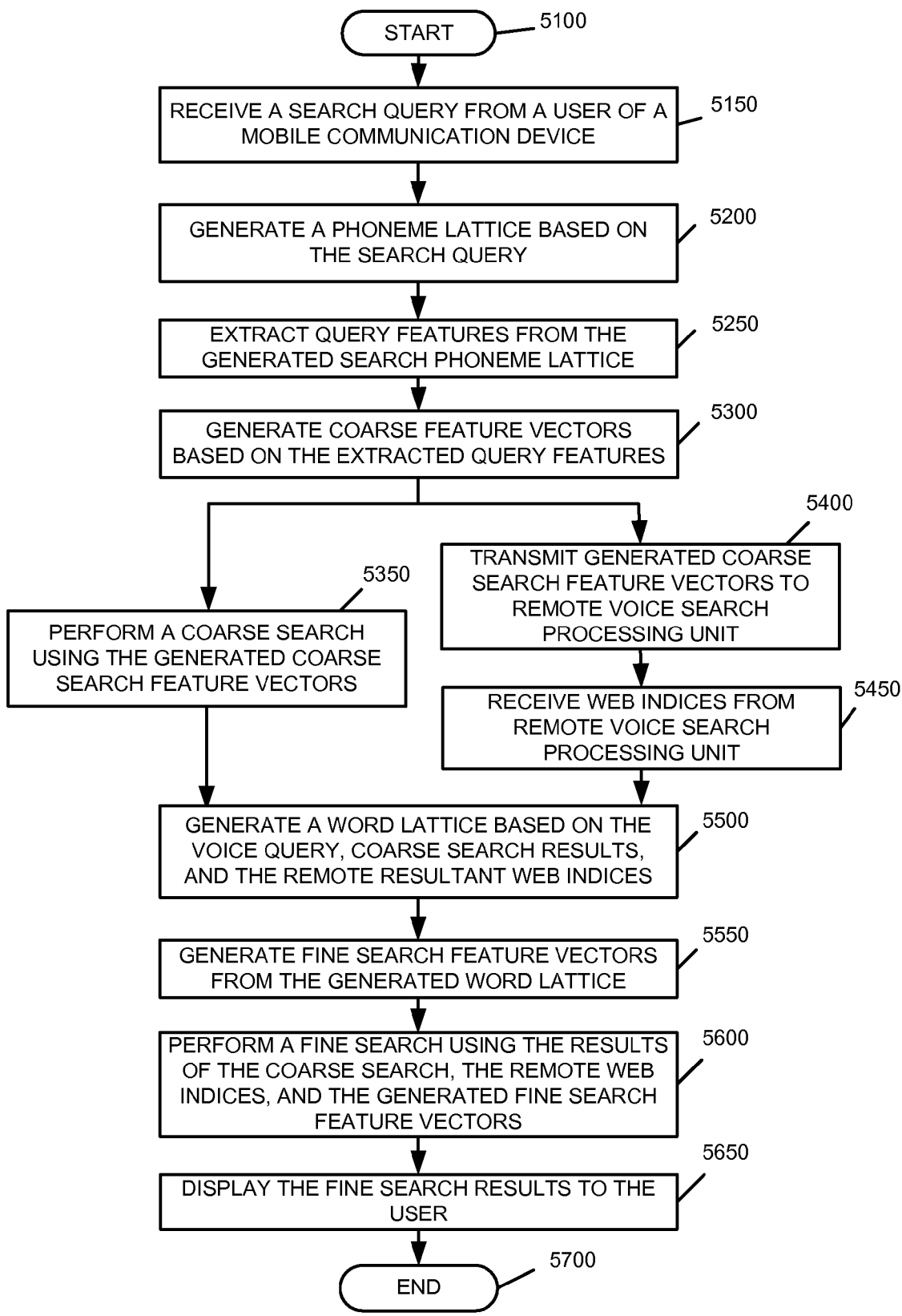
FIG. 5 is an exemplary flowchart illustrating one possible voice search process in accordance with one possible embodiment of the invention.

FIG. 5 is an exemplary flowchart illustrating one possible voice search process as performed by the mobile communication device 120 including the voice search engine 280 in accordance with one possible embodiment of the invention. The process begins at step 5100 and continues to step 5150 where the voice search engine 280 receives a search query from the user of the mobile communication device 120. The process will be described below in relation to the components of the voice search engine 280.

At step 5200, the coarse search ASR 310 of the voice search engine 280 generates a lattice of coarse linguistic representations, such as a phoneme lattice, from speech parts in the search query. A phoneme lattice may contain a series of connected nodes and edges, for example. Each edge may represent a phoneme with a score being the log of the probability of the hypothesis. The nodes on the two ends of each edge denote the start time and end time of the phoneme.

At step 5250, the coarse search feature vector generator 320 extracts query features from the generated search phoneme lattice. The coarse search feature vector generator 320 extracts index terms or "features" from the generated phoneme lattices. These features may be extracted according to their probabilities (correctness), for example.

At step 5300, the coarse search feature vector generator 320 generates coarse search feature vectors based on the extracted query features. In this manner, the coarse search feature vector generator 320 maps each of the extracted features to the generated phoneme lattices where the feature appears. The coarse search feature vector generator 320 also generates coarse search feature vectors based on linguistic metadata from the metadata database 370.

At step 5350, the coarse search module 330 performs a coarse search using the coarse search feature vectors. For a given search query, a set of top candidates, usually several times the amount of the final search results, will be returned for a more detailed search.

At step 5400, the voice search engine 280 transmits the generated coarse search feature vectors to the remotes voice search processing unit 130 using transceiver 250. At step 5450, the voice search engine 280 receives the remote resultant web indices along with the indices' linguistic representations from the remote voice search processing unit 130 through transceiver 250. Please note that one of skill in the art may appreciate that steps 5400 and 5450 may be performed either simultaneously, in parallel, before or after step 5350, but in general, should be completed before step 5500.

At step 5500 the fine search ASR 340 generates a lattice of fine linguistic representations, such as a word lattice, for example, from the speech parts of the search query based on the coarse search results and the received remote resultant web indices. The word lattice may contain a series of connected nodes and edges. Each edge may represent a word with a score being the log of the probability of the hypothesis. The nodes on the two ends of each edge denote the start time and end time of the word.

At step 5550, the fine search feature vector generator 350 generates fine search feature vectors from the word lattice of the search query. The fine search feature vector generator 350 also directly generates fine search feature vectors based on linguistic representations of the coarse search results and the received remote resultant web indices.

At step 5600, the fine search module 360 performs a fine search based on the fine search feature vectors generated for search query, the coarse search results, and the remote resultant web indices. In this manner, the fine search module 360 compares the fine search feature vectors of speech query and that of both the coarse search results and the received remote resultant web indices, for example.

At step 5650, the display 290 displays the fine search results to the user. The process goes to step 5700, and ends.

Alternatively, the display 290 may display the fine search results to the user and await a user selection of one particular result in response to a prompt for example. The selected result may be transmitted by the voice search engine 280 using the transceiver 250 to the remote voice search processing unit 130 information may be retrieved from the Internet 140. The retrieved information on that user selection may then be received by the mobile communication device 120 for viewing on the display 290.

In another possible alternative, the voice search engine 280 may automatically transmit the best candidate from the fine search results to the remote voice search processing unit 130. The voice search engine 280 would then receive information specific to the best candidate from the remote voice search processing unit 130 and display that information to the user on display 290.

Figure 6:
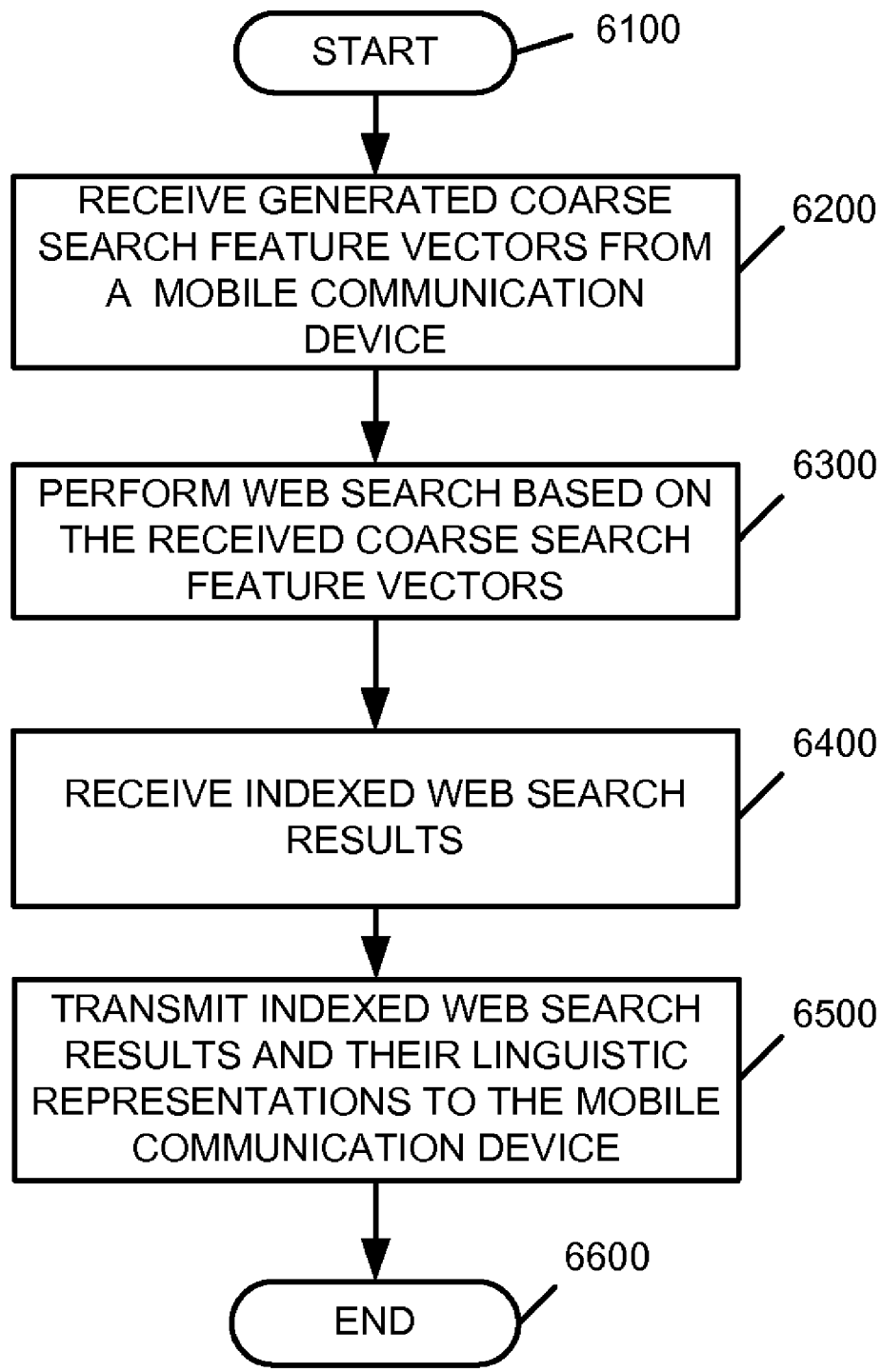
FIG. 6 is an exemplary flowchart illustrating one possible remote voice search process in accordance with one possible embodiment of the invention.

FIG. 6 is an exemplary flowchart illustrating one possible remote voice search process in accordance with one possible embodiment of the invention. The process begins at step 6100 and goes to step 6200 where the web search processing module 490 in the remote voice search processing unit 130 receives generated coarse search feature vectors of the search query from the mobile communication device 120.

At step 6300, the web search processing module 490 performs an web search using one or more Internet browsers/search engines 150. At step 6400, the web search processing module 490 receives the indexed web search results from the one or more Internet browsers/search engines 150.

At step 6500, the web search processing module 490 transmits the indexed web search results and their linguistic representations to the mobile communication device 120. The process then goes to step 6600 and ends.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the voice search engine 280 in FIGS. 2-3 each processing the content in various possible ways. It does not necessarily need to be one system used by all end users. Accordingly, the appended claims and their legal equivalents should only define the invention, rather than any specific examples given.

I claim:

1. A mobile communication device comprising:
a voice search engine that receives a search query from a user of the mobile communication device, converts speech parts in the search query into linguistic representations, generates a search phoneme lattice based on the linguistic representations, extracts query features from the generated search phoneme lattice, generates coarse search feature vectors based on the extracted query features, and performs a coarse search using the generated coarse search feature vectors;
a transceiver that transmits the generated coarse search feature vectors to a remote voice search processing unit and receives web indices from the remote voice search processing unit based on the generated coarse search feature vectors;
wherein the voice search engine performs a fine search using the results of the coarse search, the remote web indices, and fine search feature vectors, the fine search feature vectors generated from a word lattice based on the search query, the coarse search results, and the remote web indices; and
a display that displays the fine search results to the user.

2. The mobile communication device of claim 1 wherein the linguistic representations are at least one of words, morphemes, syllables, and phonemes of at least one language.

3. The mobile communication device of claim 1 further comprising:
a metadata database that stores metadata;
wherein the coarse search feature vectors and the fine search feature vectors are generated using metadata from the metadata database, the metadata being at least one of audio files, audio recordings, voice mails, recorded conversations, notes, messages, text messages, and annotations.

4. The mobile communication device of claim 1 wherein the web indices are the results of at least one search conducted by at least one web search engine.

5. The mobile communication device of claim 1 wherein the coarse search results and the web indices contain a plurality of candidate selections based on the coarse search feature vectors.

6. The mobile communication device of claim 1 wherein the fine search results contain a best candidate out of the coarse search results and the web indices.

7. The mobile communication device of claim 6 wherein the transceiver transmits the best candidate to the remote voice search processing unit and receives information specific to the best candidate from the remote voice search processing unit.

8. The mobile communication device of claim 1 wherein the fine search results contain a plurality of best candidates out of the coarse search results and the web indices, and wherein the display displays the plurality of candidates to the user.

9. The mobile communication device of claim 8 wherein the voice search engine receives a selection of at least one of the plurality of best candidates from the user, and wherein the transceiver transmits the user's selection to the remote voice search processing unit and receives information specific to the best candidate from the remote voice search processing unit.

10. The mobile communication device of claim 1 wherein the mobile communication device is one of a mobile telephone, cellular telephone, a wireless radio, a portable computer, a laptop, an MP3 player, satellite radio, and a satellite television.

* * * * *